United States Patent
Kim et al.

(10) Patent No.: US 9,857,914 B2
(45) Date of Patent: *Jan. 2, 2018

(54) TOUCH SENSING SYSTEM

(71) Applicant: LG Display Co., Ltd., Seoul (KR)

(72) Inventors: Beomjin Kim, Seoul (KR); Sunghoon On, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,615

(22) Filed: Sep. 25, 2015

(65) Prior Publication Data

US 2016/0092029 A1    Mar. 31, 2016

(30) Foreign Application Priority Data

Sep. 26, 2014 (KR) .......................... 10-2014-0129401

(51) Int. Cl.
| | | |
|---|---|---|
| *G06F 3/045* | (2006.01) | |
| *G06F 3/041* | (2006.01) | |
| *G06F 3/044* | (2006.01) | |
| *G05F 1/46* | (2006.01) | |

(52) U.S. Cl.
CPC ............ *G06F 3/0418* (2013.01); *G06F 3/044* (2013.01); *G06F 3/0412* (2013.01); *G05F 1/463* (2013.01); *G06F 3/0416* (2013.01); *G06F 2203/04111* (2013.01)

(58) Field of Classification Search
CPC ...... G06F 3/044; G06F 3/0416; G06F 3/0412; G06F 3/0418; G06F 2203/04111
USPC ............................. 345/173, 174; 178/18.06
See application file for complete search history.

(56) References Cited

U.S. PATENT DOCUMENTS

2011/0298746 A1*  12/2011  Hotelling .............. G06F 3/0418
                                                    345/174
2014/0267132 A1*   9/2014  Rabii .................... G06F 3/0418
                                                    345/174

OTHER PUBLICATIONS

United States Office Action, U.S. Appl. No. 14/970,313, dated Mar. 9, 2016, 15 pages.

* cited by examiner

*Primary Examiner* — Jimmy H Nguyen
(74) *Attorney, Agent, or Firm* — Fenwick & West LLP

(57) ABSTRACT

A touch sensing system includes a charge distributor, a pre-amplifier, an analog-to-digital converter (ADC), and a temperature compensating device. The temperature compensating device varies one or more of a first reference voltage supplied to the charge distributor, a second reference voltage supplied to the pre-amplifier, and the capacitance of the charge distributor, in response to temperature data from a temperature sensor.

16 Claims, 10 Drawing Sheets

TOUCH SENSING SYSTEM

CROSS-REFERENCE TO RELATED APPLICATION

This application claims the benefit of Republic of Korea Patent Application No. 10-2014-0129401 filed on Sep. 26, 2014, which is incorporated by reference herein in its entirety.

BACKGROUND OF THE INVENTION

Field of the Invention

The present invention relates to a touch sensing system with a temperature compensation function.

Discussion of the Related Art

User interfaces (UI) enable humans (users) to interact with various types of electric or electronic devices so that they can easily control the devices as they want. Typical examples of the user interfaces include keypads, keyboards, mice, on-screen displays (OSD), and remote controllers with an infrared communication capability or radio frequency (RF) communication capability. The user interface technology is continuing to make progress toward higher user sensitivity and ease of operation. Recently, user interfaces have been evolving into touch UI, voice recognition UI, 3D UI, etc.

Capacitive touchscreens can be implemented as capacitance sensors. The capacitance sensors may be classified into self-capacitance sensors and mutual capacitance sensors.

As shown in FIG. 1, a mutual capacitance sensor includes mutual capacitance Cm formed between two electrodes Tx and Rx. A sensing part 12 applies a driving signal (or stimulus signal) to Tx lines Tx1 to Tx5, and senses touch input based on a change in the amount of charge charged in the mutual capacitance before and after a touch on Rx lines Rx1 to Rx6. The mutual capacitance Cm decrease when a conductive object is brought closer to it. The sensing part 12 converts the change in the amount of charge to digital data (hereinafter, referred to as 'touch raw data') by an analog-to-digital converter and outputs it.

As shown in FIG. 2, a self-capacitance sensor includes self-capacitance Cs formed in each sensor electrode. A sensing part 14 supplies charge to each sensor electrode and senses touch input based on a change in the amount of charge in the self-capacitance Cs. The self-capacitance increases when a conductive object is brought closer to it. The sensing part 14 converts the change in the amount of charge to touch raw data by an ADC and outputs it.

The capacitive touchscreens, if embedded in in-cell type in a pixel array of a display panel, may have poor touch sensitivity because the sensor's capacitance changes with temperature, even without touch input. For example, as shown in FIG. 3, the mutual capacitance Cm changes with temperature with a positive slope, due to a change in capacitance between metal wires of a pixel array. As shown in FIG. 4, the self-capacitance changes with temperature with a negative slope, due to a change in the capacitance of liquid crystals and the parasitic capacitance of TFTs (thin film transistors). A test result shows that there is no change in mutual capacitance at an ambient temperature of 25 if there is no touch input.

Since the amount of charge entering the sensing part 12 or 14 changes with temperature, the value of touch raw data output from the sensing part 12 or 14 changes. In a touch sensing algorithm, touch raw data is compared with a preset threshold to detect the presence or absence of a touch and calculate touch input coordinates. As such, a steep change in temperature may cause a touch input detection error. For temperature compensation, the capacitance of a capacitor Cfb of a pre-amplifier installed at an input terminal of the sensing part 12 or 14 may be increased, or the input range of the ADC may be increased. However, this may cause other problems like an increase in the area of the capacitor and an increase in the power consumption of the ADC.

SUMMARY OF THE INVENTION

The present invention provides a touch sensing system capable of preventing a reduction in touch sensitivity caused by a temperature change.

A touch sensing system of this invention includes a charge distributor, a pre-amplifier, an analog-to-digital converter (ADC), and a temperature compensating device.

The charge distributor is connected between the touch sensor and a pre-amplifier. The pre-amplifier receives charge from a touch sensor. The ADC converts an analog voltage output from the pre-amplifier to digital data to generate touch raw data. The temperature compensating device varies one or more of a first reference voltage supplied to the charge distributor, a second reference voltage supplied to the pre-amplifier, and the capacitance of the charge distributor, in response to temperature data from a temperature sensor.

The present invention varies one or more of a first reference voltage supplied to the charge distributor, a second reference voltage supplied to the pre-amplifier, and the capacitance of the charge distributor, based on real-time temperature measurements from a temperature sensor. Consequently, the present invention prevents any change in touch data with temperature to improve the touch sensitivity.

Figure 1:
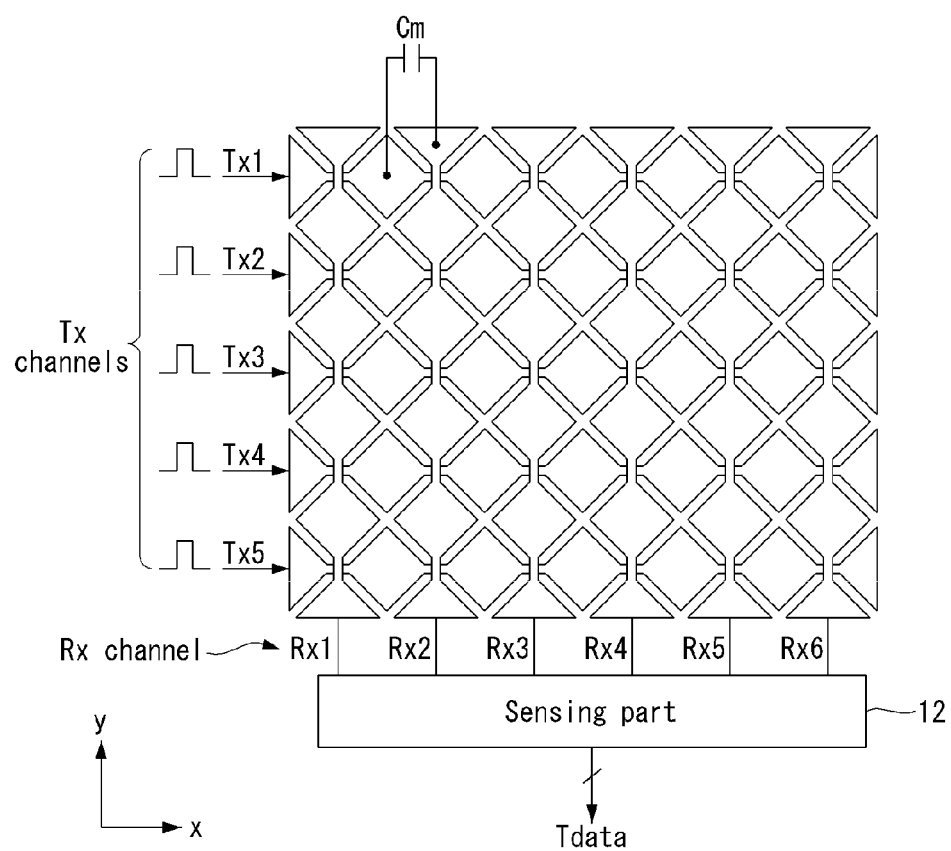
FIG. 1 is a view showing a mutual capacitance touchscreen.
Figure 2:
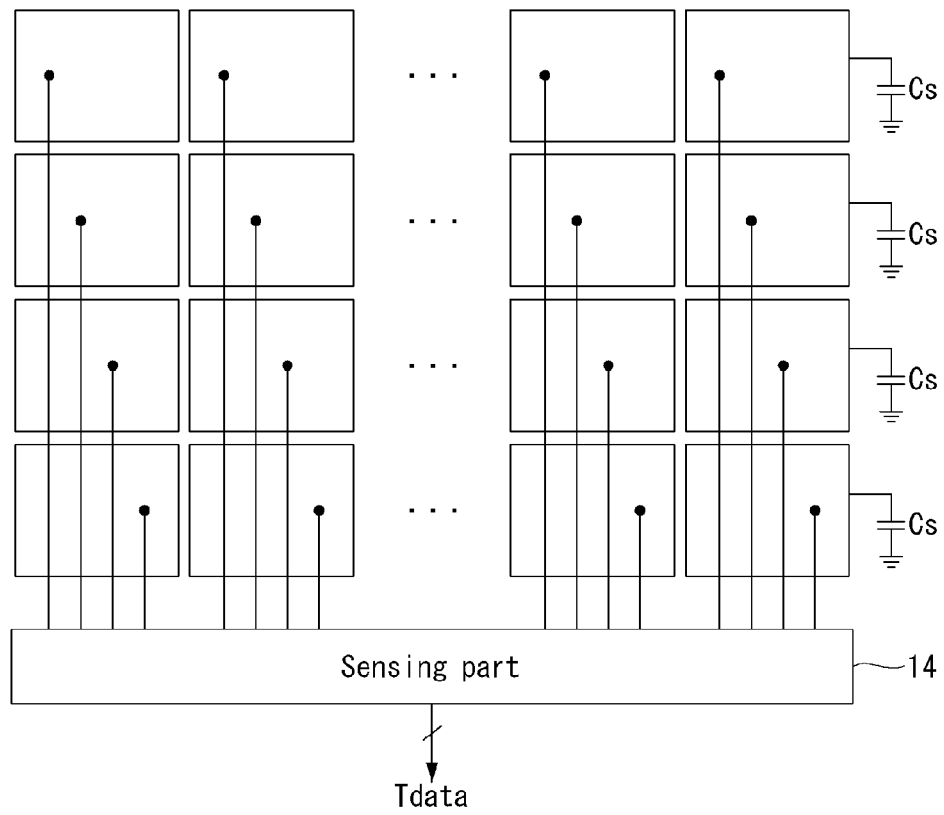
FIG. 2 is a view showing a self-capacitance touchscreen.
Figure 3:
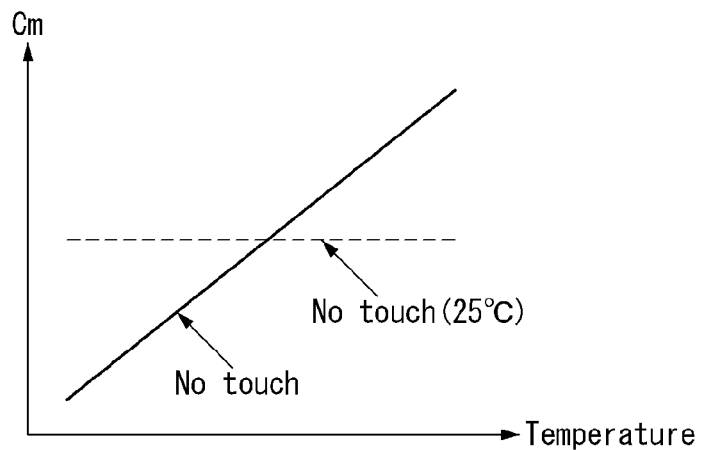
FIG. 3 is a view showing a change in mutual capacitance with temperature in the case of a mutual capacitance touchscreen embedded in a pixel array.
Figure 4:
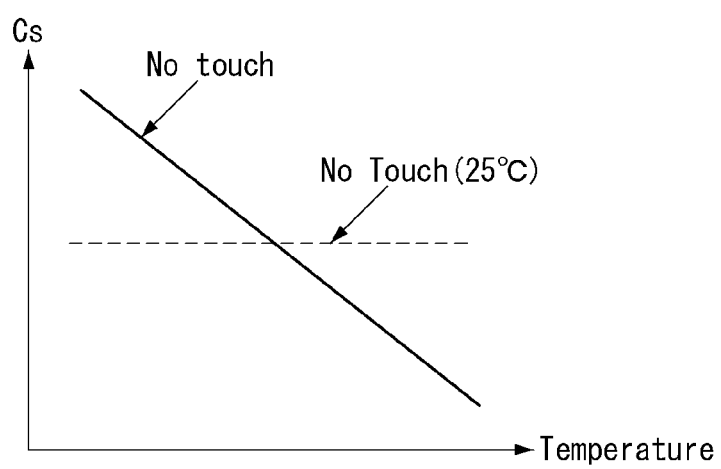
FIG. 4 is a view showing a change in self-capacitance with temperature in the case of a self-capacitance touchscreen embedded in a pixel array.

DETAILED DESCRIPTION OF THE EMBODIMENTS display device according to the present invention may be implemented as a flat panel display such as a liquid crystal display (LCD), a field emission display (FED), a plasma display panel (PDP), an organic light emitting display (OLED), or an electrophoresis display (EPD). Although the following exemplary embodiments will be described with respect to a liquid crystal display as an example of the flat plane display, it is to be noted that the display device of this invention is not limited to the liquid crystal display.

Hereinafter, exemplary embodiments of the present invention will be described in detail with reference to the accompanying drawings. Like reference numerals refer to like elements throughout the specification. In the following description, detailed descriptions of well-known functions or configurations will be omitted where they may unnecessarily obscure the subject matters of the invention.

Figure 5:
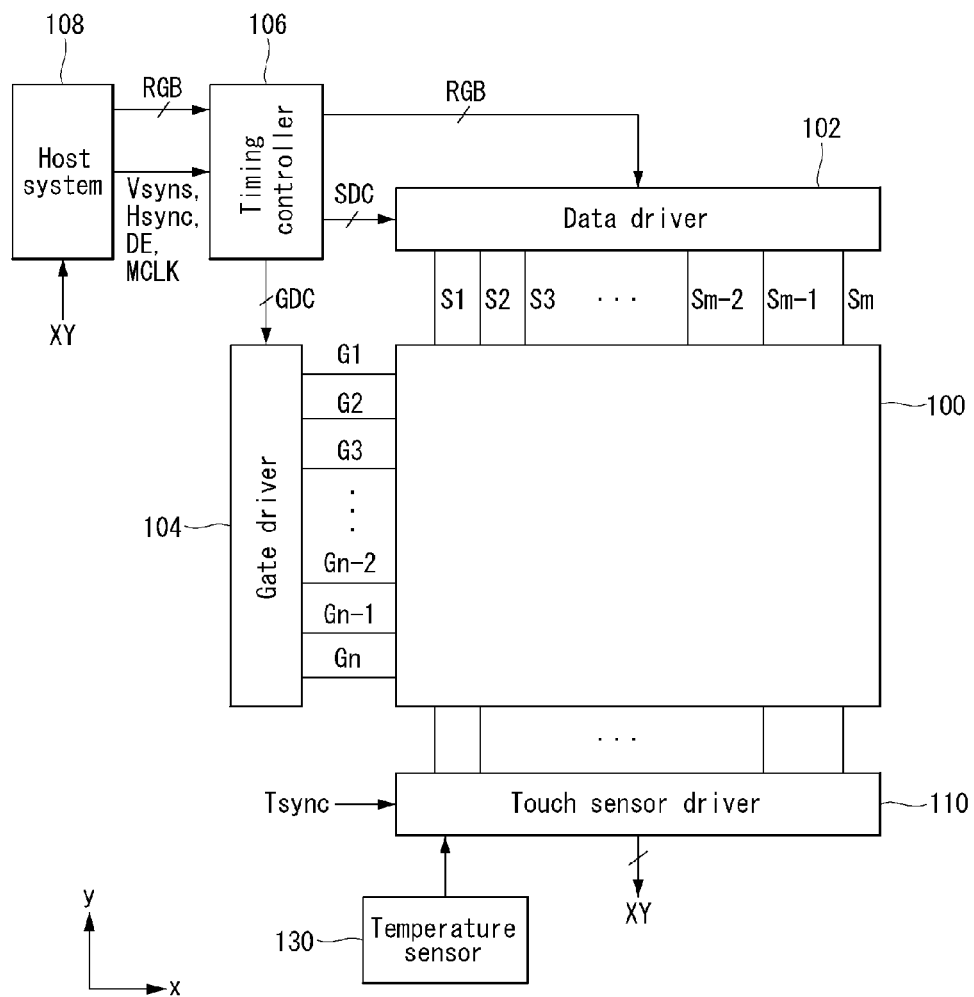
FIG. 5 is a view showing a touch sensing system according to the present invention.
Figure 6:
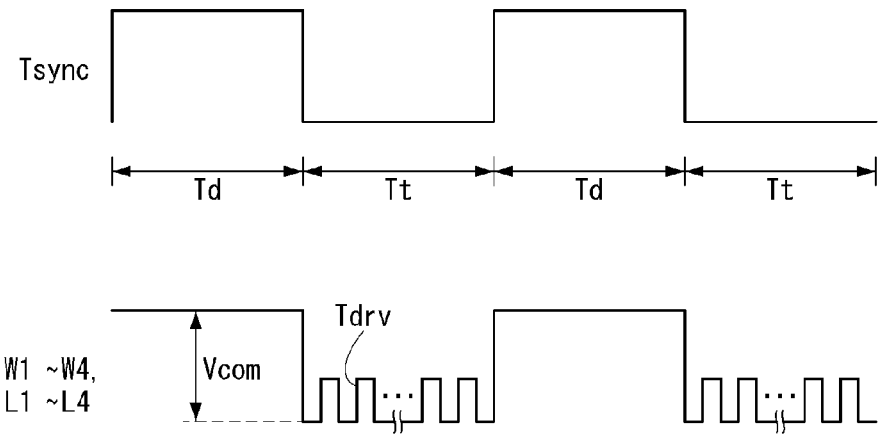
FIG. 6 is a timing diagram showing an example in which a display device according to the present invention is driven in a time-dividing manner in a display driving period and a touch sensor driving period.

Referring to FIGS. 5 and 6, a display device of this invention includes a touchscreen attached to a display panel 100.

The touchscreen includes capacitive touch sensors. The mutual capacitance or self-capacitance of the touch sensors changes.

The display device of this invention includes display drive circuits 102, 104, and 106 for writing input image data to a pixel array, a touch sensor driver 110 for sensing touch input based on a change in the amount of charge in the touch sensors before and after a touch, and a temperature sensor 130.

1 frame period may be time-divided into a display driving period Td and a touch sensor driving period Tt, which are defined by a touch synchronization signal Tsync. During the display driving period Td, input image data is written to the pixels. During the touch sensor driving period Tt, the touch sensors are driven to sense touch input.

In the case of a liquid crystal display, a liquid crystal layer is formed between substrates of the display panel 100. Liquid crystal molecules are driven by an electric field generated due to a potential difference between a data voltage applied to a pixel electrode 11 and a common voltage Vcom applied to a common electrode.

The pixel array of the display panel 100 includes pixels defined by data lines S1 to Sm (m is a positive integer) and gate lines G1 to Gn (n is a positive integer), touch sensors divided up from the common electrode, and sensor lines connected to the touch sensors.

Each pixel includes a TFT (thin film transistor) formed at the crossings of the data lines S1 to Sm and the gate lines G1 to Gn, a pixel electrode that receives a data voltage through the TFT, a common electrode divided into touch sensor electrodes, and a storage capacitor Cst connected to the pixel electrode and for maintaining the voltage of a liquid crystal cell, The touch sensor electrodes may be formed as a common electrode commonly connected to the pixels of the pixel array. The common electrode is divided into electrode patterns for the touch sensors. Accordingly, the touch sensors are embedded in the pixel array and connected to the pixels. In the following exemplary embodiment, the common voltage is illustrated as being applied to the pixels of the liquid crystal display device, but the present invention is not limited thereto. For example, the common voltage should be construed as a voltage commonly supplied to the pixels of a flat panel display device, such as a high-potential/low-potential power voltage (VDD/VSS) applied commonly to the pixels of an organic light emitting diode display.

On the upper substrate of the display panel 100, a black matrix, color filters, etc may be formed. The lower substrate of the display panel 100 may be implemented in a COT (color filter on TFT) structure. In this case, the color filters may be formed on the lower substrate of the display panel 100. Polarizers are respectively attached to the upper and lower substrates of the display panel 100, and an alignment film for setting a pre-tilt angle of liquid crystals is formed on an inner surface contacting the liquid crystals. A column spacer for maintaining a cell gap of the liquid crystal layer is formed between the upper and lower substrates of the display panel 100.

A backlight unit may be disposed under the back of the display panel 100. The backlight unit is an edge-type or direct-type backlight unit which illuminates the display panel 100. The display panel 100 may be implemented in any well-known liquid crystal mode, such as a TN (Twisted Nematic) mode, a VA (Vertical Alignment) mode, an IPS (In-Plane Switching) mode, and an FFS (Fringe Field Switching) mode. A self-luminous display device such as an organic light emitting diode display requires no backlight unit.

The display drive circuits 102, 104, and 106 include a data driver 102, a gate driver 104, and a timing controller 106.

The data driver 102 converts digital video data RGB of an input image received from the timing controller 106 to an analog positive/negative gamma compensation voltage to output a data voltage during the display driving period Td. The data voltage output from the data driver 102 is supplied to the data lines S1 to Sm.

The data driver 102 may apply an alternating current signal having the same phase as a touch driving signal Tdrv to the data lines S1 to Sm to minimize the parasitic capacitance between the touch sensors and the data lines. This is because the voltages at both ends of the parasitic capacitance change simultaneously and the smaller the voltage difference, the less the amount of charge stored in the parasitic capacitance.

During the display driving period Td, the gate driver 104 sequentially supplies a gate pulse (or scan pulse) synchronized with the data voltage to the gate lines G1 to Gn and selects lines of the display panel 100 to which the data voltage is written. The gate pulse swings between a gate high voltage VGH and a gate low voltage VGL. The gate pulse is applied to the gates of the pixel TFTs through the gate lines G1 to Gn. The gate high voltage VGH is set to a voltage higher than a threshold voltage of the pixel TFTs and turns on the pixel TFTs. The gate low voltage VGL is a voltage lower than the threshold voltage of the pixel TFTs.

The gate driver 104 applies an alternating current signal having the same phase as the touch driving signal Tdrv applied to the touch sensors to the gate lines G1 to Gn during the touch sensor driving period Tt to minimize the parasitic capacitance between the touch sensors and the gate lines.

The voltage of the alternating current signal applied to the gate lines G1 to Gn during the touch sensor driving period Tt should be lower than the gate high voltage VGH and the threshold voltage of the pixel TFTs, so as to avoid changes in the data written to the pixels.

The timing controller 106 receives timing signals, such as a vertical synchronization signal Vsync, a horizontal synchronization signal Hsync, a data enable signal DE, and a main clock MCLK, from a host system 108, and synchronizes the operation timings of the data driver 102, gate driver 104, and touch sensor driver 110. In FIG. 5, SDC is a data timing signal for controlling the operation timing of the data driver 102, and GDC is a gate timing signal for controlling the operation timing of the gate driver 104.

The host system 108 may be implemented as any one of the following: a television system, a set-top box, a navigation system, a DVD player, a Blue-ray player, a personal computer PC, a home theater system, and a phone system. The host system 108 comprises a system-on-chip (SoC) having a scaler incorporated therein, and converts digital video data of an input image into a format suitable for the resolution of the display panel 100. The host system 108 transmits the timing signals Vsync, Hsync, DE, and MCLK, along with the digital video data RGB of the input image, to the timing controller 106. Further, the host system 108 executes an application associated with coordinate information XY of touch input from the touch sensor driver 110.

The timing controller 106 or the host system 108 may generate a synchronization signal Tsync for synchronizing the display drive circuits 102, 104, and 106 with the touch sensor driver 110.

The touch sensor driver 110 supplies charge to the touch sensors using the sensing part, and detects a change in the amount of charge in the touch sensors before and after a touch and generates touch raw data. The touch sensor driver 110 executes a touch sensing algorithm using an operation logic circuit. In the touch sensing algorithm, touch raw data is compared with a preset threshold to detect touch input, and an identification code and coordinate information XY are added to each touch input and transmitted to the host system 108.

Figure 14:
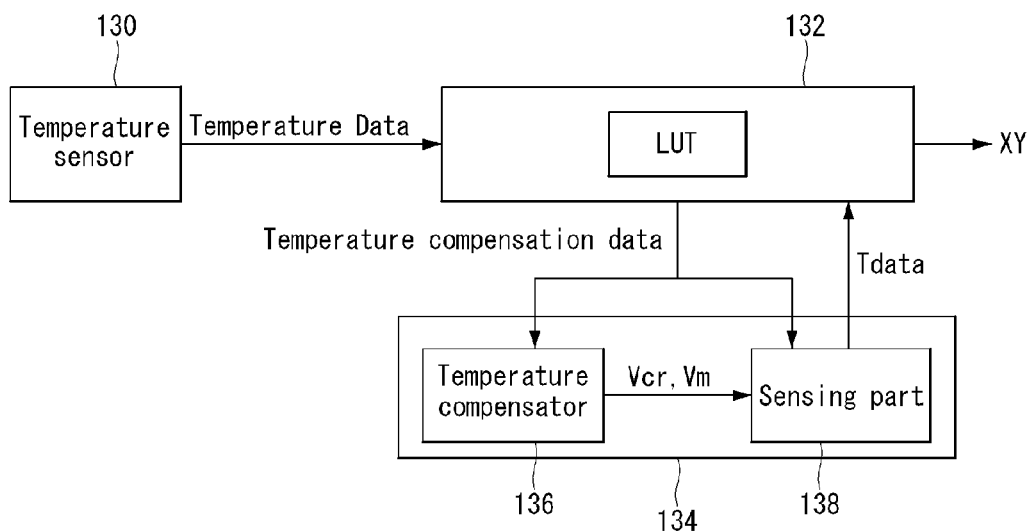
FIG. 14 is a block diagram showing a temperature compensating device according to an exemplary embodiment of the present invention.

The touch sensor driver 110 includes a temperature compensator as shown in FIG. 14. The temperature compensator varies the analog reference voltage (hereinafter, 'reference voltage') and capacitance of the sensing part, in response to temperature data input from the temperature sensor 130, and compensates for a change in the capacitance of the touch sensors caused by a temperature change.

In the touch sensor driver 110, an analog circuit of the sensing part includes a charge distributor and a pre-amplifier. The charge distributor is connected to the front end of the pre-amplifier to distribute charge received from the touch sensors and remove excessive charge supplied to the pre-amplifier. The pre-amplifier amplifies a change in the amount of charge in the touch sensors and supplies it to the ADC. The reference voltage includes a reference voltage (hereinafter, 'first reference voltage') Vcr for the charge distributor and a reference voltage (hereinafter, 'second reference voltage') Vm for the pre-amplifier. The charge distributor includes variable capacitance Ccr.

Figure 7:
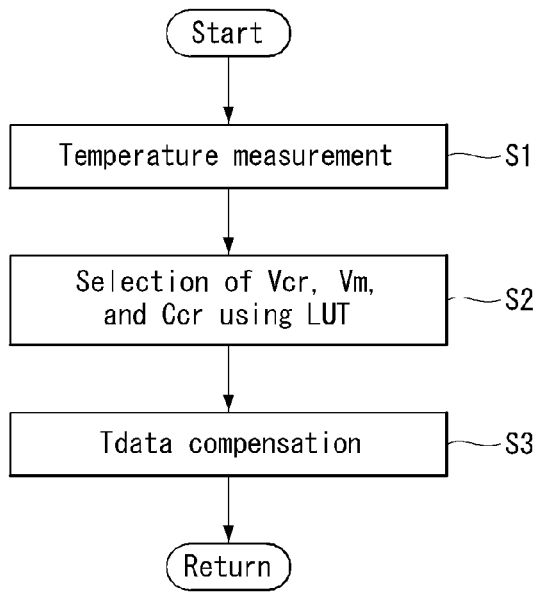
FIG. 7 is a flowchart showing a temperature compensation method according to an exemplary embodiment of the present invention.

FIG. 7 is a flowchart showing a temperature compensation method of touch sensor according to an exemplary embodiment of the present invention. This temperature compensation method is implemented by the temperature sensor 130 and the touch sensor driver 110.

Referring to FIG. 7, the temperature sensor 130 senses the temperature of the display panel 100 in real time. The touch sensor driver 110 receives temperature data from the temperature sensor 130 (S1).

The touch sensor driver 110 selects the reference voltages Vm and Vcr and the capacitance Ccr of the charge distributor depending on the temperature of the display panel by using a look-up table LUT (S2). The look-up table LUT includes first temperature compensation data, second temperature compensation data, and third temperature compensation data whose values change with temperature in a touch sensor temperature change test.

The first temperature compensation data is used to change the first reference voltage Vcr depending on the temperature of the display panel 100. The second temperature compensation data is used to change the capacitance Ccr of the charge distributor with temperature. The third temperature compensation data is used to change the second reference voltage Vm with temperature. Not all of the first to third temperature compensation data are required.

The look-up table may be divided into first to third look-up tables. First temperature compensation data corresponding to temperature data is selected from the first look-up table. Second temperature compensation data corresponding to temperature data is selected from the second look-up table. Third temperature compensation data corresponding to temperature data is selected from the third look-up table.

The temperature compensation data is selected from the look-up table. The temperature compensation data selects the reference voltages Vcr and Vm to be input into the analog circuit of the sensing part, and the capacitance Ccr of the charge distributor are selected. Accordingly, the temperature compensation data varies the reference voltages Vcr and Vm of the analog circuit and the capacitance Ccr depending on the temperature of the display panel.

Figure 8:
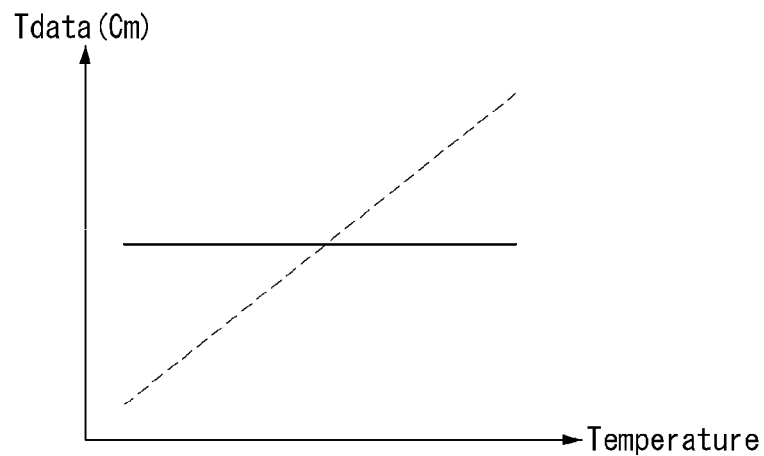
FIG. 8 is a view showing a result of temperature compensation on touch raw data from a mutual capacitance sensor.
Figure 9:
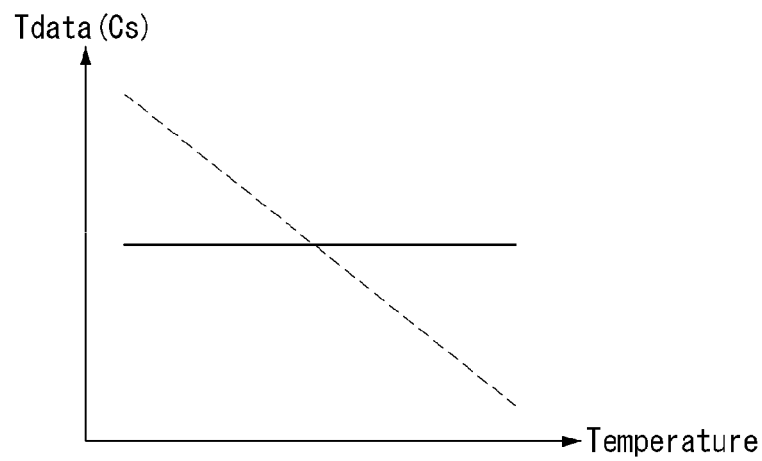
FIG. 9 is a view showing a result of temperature compensation on touch raw data from the self-capacitance sensor.

If the reference voltage Vcr and Vm of the analog circuit and the capacitance Ccr change, the output voltage of the pre-amplifier also changes. Therefore, as shown in FIGS. 8 and 9, touch raw data Tdata is compensated with temperature compensation data so that the touch raw data does not change with temperature when there is no touch input. In FIGS. 8 and 9, the solid line indicates touch raw data that is compensated with temperature compensation data.

Figure 10:
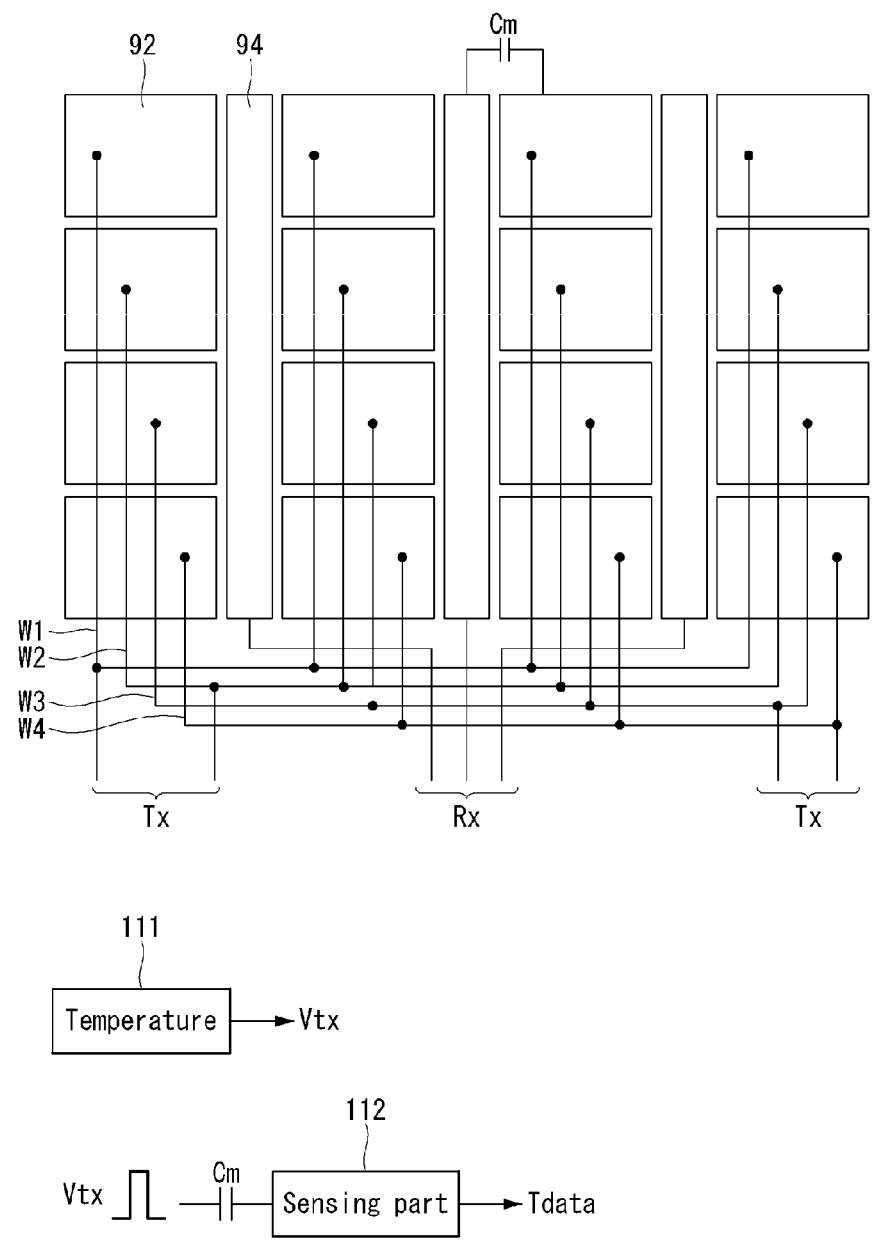
FIG. 10 is a view showing an in-cell type mutual capacitance sensor structure and a touch sensor driver according to an exemplary embodiment of the present invention.
Figure 11:
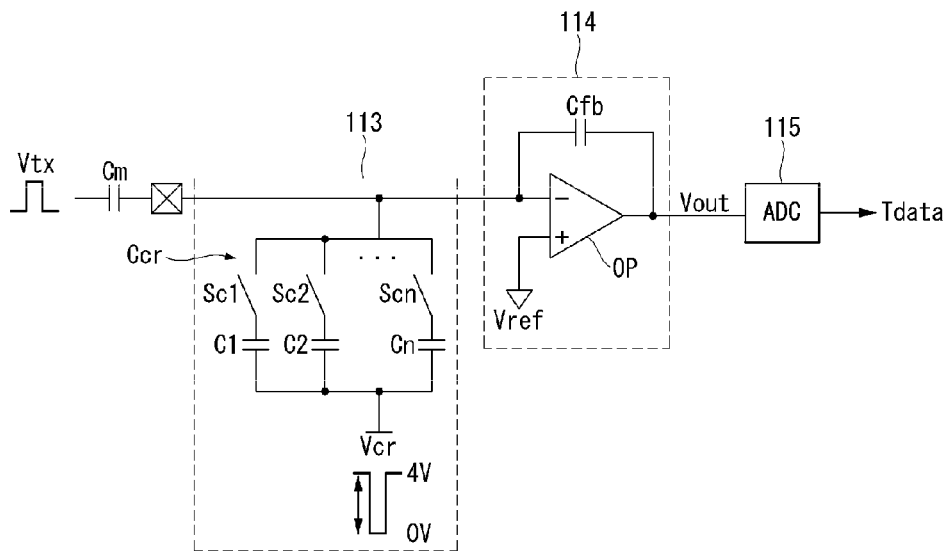
FIG. 11 is a circuit diagram showing in detail the sensing part of FIG. 10.

FIG. 10 is a top plane view showing an in-cell type mutual capacitance sensor structure and the touch sensor driver 110 according to an exemplary embodiment of the present invention. FIG. 11 is a circuit diagram showing in detail the sensing part of FIG. 10.

Referring to FIG. 10 and FIG. 11, the mutual capacitance Cm includes electrode patterns 92 and 94 divided up from the common electrode.

The electrode patterns 92 and 94 include Tx electrodes 92 connected through Tx routing wires W1 to W4 and Rx electrodes 94 disposed between the Tx electrodes 92. The electrode patterns 92 and 94 may be formed of a transparent metal such as ITO (indium tin oxide). The Tx routing wires W1 to W4 may be formed of a low-resistance metal such as copper (Cu).

The touch sensor driver 110 includes a Tx driver 111 and a sensing part 112. The Tx driver 111 supplies a touch driving signal (or stimulus signal) Vtx to the Tx electrodes 92 through the Tx routing wires W1 to W4. The sensing part 112 includes an analog circuit and an ADC. The analog circuit receives charge from the mutual capacitance Cm in synchronization with the touch driving signal Vtx, and outputs a change in the amount of charge before and after a touch as an analog voltage. The ADC converts the analog voltage input from the analog circuit to digital data and outputs touch raw data.

The analog circuit includes a charge distributor 113 and a pre-amplifier 114.

The charge distributor 113 is connected between the mutual capacitance Cm and the pre-amplifier 114 and removes excessive charge entering the pre-amplifier 114. The charge distributor 113 includes a plurality of capacitors C1 to Cn and plurality of switches Sc1 to Scn that are connected between an input terminal of the sensing part 112 and a first reference voltage source.

Figure 15:
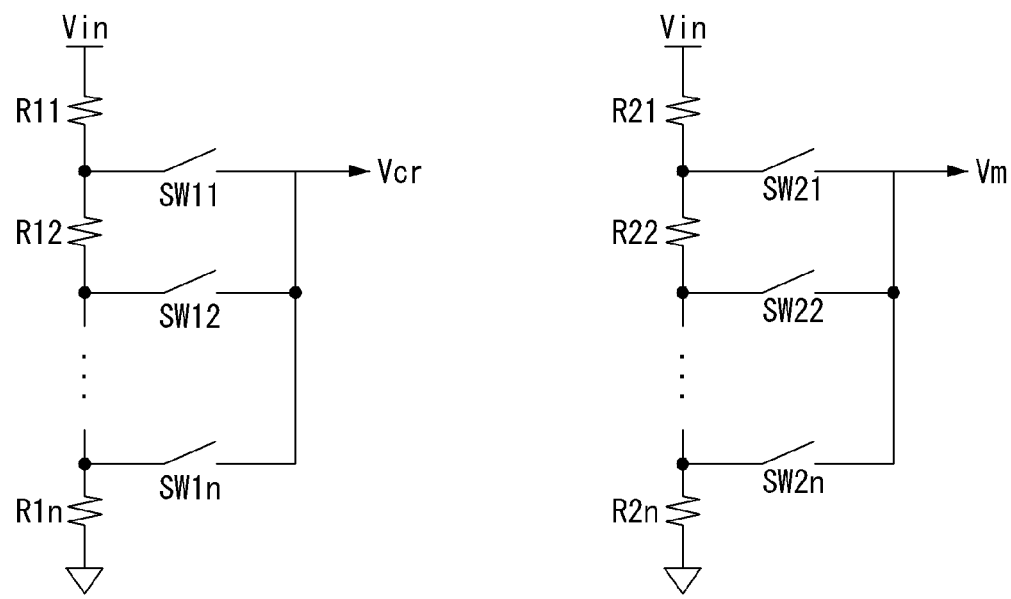
FIG. 15 is a circuit diagram showing an example of first and second reference voltage sources.

As shown in FIG. 11, the capacitors C1 to Cn may be connected in parallel through the switches Sc1 to Scn between the input terminal of the sensing part 112 and the first reference voltage source, but the present invention is not limited thereto. For example, the capacitors C1 to Cn may be connected in a combination of serial and parallel connections. The first reference voltage source may be implemented as such a circuit as shown in FIG. 15. The first reference voltage source selects a voltage level of the first reference voltage Vcr in response to first temperature compensation data. The switches Sc1 to Scn are turned on/off in response to second temperature compensation data and select capacitors to be connected between the input terminal and the first reference voltage source to vary the capacitance Ccr of the charge distributor 113.

The pre-amplifier 114 includes an operational amplifier OPamp and a capacitor Cfb connected between an inverting input terminal (−) of the operational amplifier OP and an output terminal. A predetermined reference voltage Vref is supplied to a non-inverting terminal (+) of the operational amplifier OP. The output voltage Vout of the pre-amplifier 114 is as shown in Equation 1. As can be seen from Equation 1, the output voltage Vout of the pre-amplifier 114 may change depending on Vcr and Ccr, which vary with temperature. Accordingly, variation of the output voltage Vout of the analog circuit with temperature can be prevented, and therefore touch raw data Tdata output from the ADC 115 may remain constant even with temperature change, as long as there is no touch input.

$$Vout = \left(Vtx \times \frac{Cm}{Cfb}\right) - \left(Vcr \times \frac{Ccr}{Cfb}\right) \qquad \text{Equation (1)}$$

where Vtx denotes the voltage of a touch driving signal supplied to the Tx electrodes, Cm denotes mutual capacitance, Cfb denotes the capacitance of the capacitor of the operational amplifier OP, Ccr denotes the capacitance of the charge distributor 113, and Vcr denotes the first reference voltage.

Figure 12:
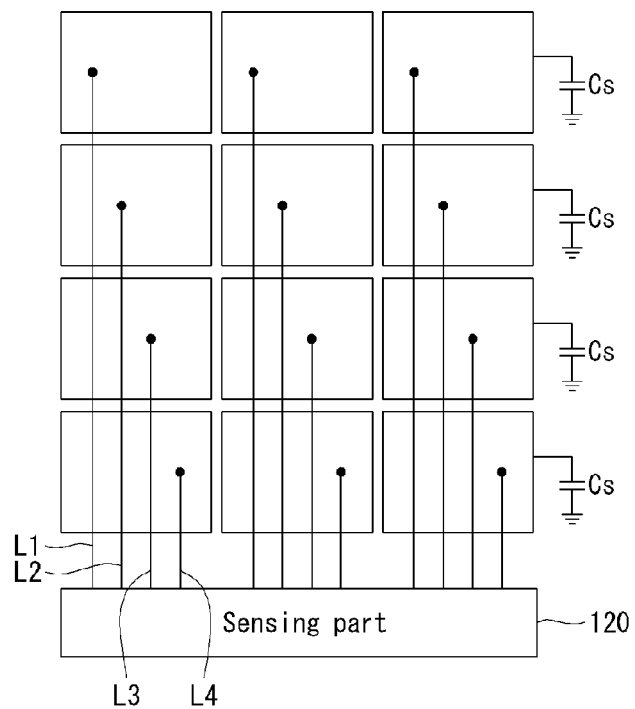
FIG. 12 is a top plane view showing an in-cell type self-capacitance sensor structure and a sensing part according to an exemplary embodiment of the present invention.
Figure 13:
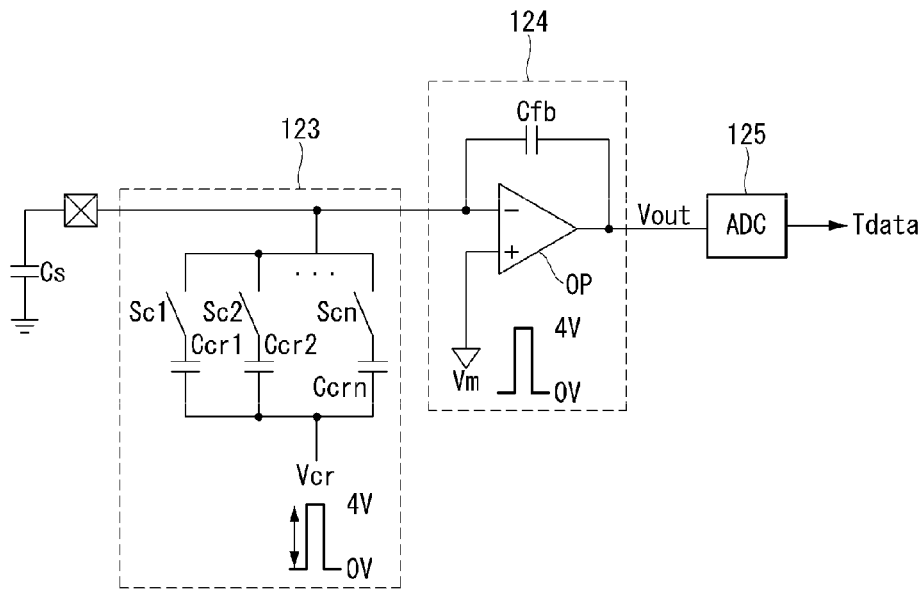
FIG. 13 is a circuit diagram showing in detail the sensing part of FIG. 12.

FIG. 12 is a top plane view showing an in-cell type self-capacitance sensor structure and a sensing part 120 according to an exemplary embodiment of the present invention. FIG. 13 is a circuit diagram showing in detail the sensing part of FIG. 12.

Referring to FIG. 12 and FIG. 13, the self-capacitance Cs includes electrode patterns 92 and 94 divided up from the common electrode.

The electrode patterns are connected to sensor lines L1 to L4. The electrode patterns may be formed of a transparent metal such as ITO (indium tin oxide). The sensor lines L1 to L4 may be formed of a low-resistance metal such as copper (Cu).

The touch sensor driver 110 includes a charge pump (not shown) and a sensing part 120. The charge pump supplies charge to the self-capacitance Cm through the sensor lines L1 to L4. The sensing part 112 includes an analog circuit and an ADC. The analog circuit receives charge from the self-capacitance Cs, and outputs a change in the amount of charge before and after a touch as an analog voltage. The ADC converts the analog voltage input from the analog circuit to digital data and outputs touch raw data.

The analog circuit includes a charge distributor 123 and a pre-amplifier 124.

The charge distributor 123 is connected between the self-capacitance Cs and the pre-amplifier 124 and removes excessive charge entering the pre-amplifier 124. The charge distributor 123 includes a plurality of capacitors C1 to Cn and plurality of switches Sc1 to Scn that are connected between an input terminal of the sensing part 120 and a first reference voltage source.

The capacitors C1 to Cn may be connected in parallel through the switches Sc1 to Scn between the input terminal of the sensing part 112 and the first reference voltage source, but the present invention is not limited thereto. The first reference voltage source may be implemented as such a circuit as shown in FIG. 15. The first reference voltage source selects a voltage level of the first reference voltage Vcr in response to first temperature compensation data. The switches Sc1 to Scn are turned on/off in response to second temperature compensation data to vary the capacitance Ccr of the charge distributor 113.

The pre-amplifier 124 includes an operational amplifier OP and a capacitor Cfb connected between an inverting input terminal (−) of the operational amplifier OP and an output terminal. A second reference voltage Vm is supplied to a non-inverting terminal (+) of the operational amplifier OP. A second reference voltage source may be composed of such a circuit as shown in FIG. 15, and selects a voltage level of the second reference voltage Vm in response to third temperature compensation data.

The output voltage Vout of the pre-amplifier 124 is as shown in Equation 2. As can be seen from Equation 2, the output voltage Vout of the pre-amplifier 124 may change depending on Vcr, Ccr, and Vm, which vary with temperature. Accordingly, variation of the output voltage of the analog circuit with temperature can be prevented, and therefore touch raw data Tdata output from the ADC 125 may remain constant even with temperature change, as long as there is no touch input.

$$Vout = \left(Vm \times \left(1 + \frac{Cs}{Cfb}\right)\right) - \left(Vcr \times \frac{Ccr}{Cfb}\right) \qquad \text{Equation (2)}$$

where Cs denotes self-capacitance, Cfb denotes the capacitance of the capacitor of the operational amplifier OP, Ccr denotes the capacitance of the charge distributor 123, Vcr denotes the first reference voltage, and Vm denotes the second reference voltage. The first and second reference voltages Vcr and Vm may vary from 0 V to 4 V, but the present invention is not limited thereto.

FIG. 14 is a block diagram showing a temperature compensating device according to an exemplary embodiment of the present invention.

Referring to FIG. 14, the temperature compensating device includes a control logic 132 and a touch data compensator 134.

The control logic 132 includes a look-up table LUT for selecting temperature compensation data and an algorithm execution unit (not shown). The control logic 132 selects temperature compensation data in response to temperature data from the temperature sensor 130, and supplies it to the touch data compensator 134. The algorithm execution unit compares touch raw data Tdata input from the touch data compensator 134 with a threshold, and decides the touch raw data higher than the threshold as touch sensor data of touch input. The algorithm execution unit adds an identification code and coordinate information XY to each touch input, and transmits them to the host system 108.

The touch data compensator 134 includes a temperature compensator 136 and a sensing part 138.

The temperature compensator 136 supplies first and second reference voltages Vcr and Vm, which vary with first and second temperature compensation data, to an analog circuit of the sensing part 138. Also, the temperature compensator 136 supplies the second temperature compensation data to switch control terminals of the charge distributors 113 and 123, in order to select the capacitances of the charge distributors 113 and 123 depending on temperature. The sensing part 138 is substantially identical to the sensing parts shown in FIG. 11 and FIG. 13, so a detailed description thereof will be omitted.

FIG. 15 is a circuit diagram showing an example of first and second reference voltage sources.

Referring to FIG. 15, the first reference voltage source includes a row of resistors R11 to R1$n$ for dividing an input voltage Vin, and a plurality of switches SW11 to SW1$n$.

The row of resistors R11 to R1$n$ divide the input voltage Vin and output a plurality of voltages with different voltage levels. The switches SW11 to SW1$n$ are connected in parallel between the row of resistors R11 to R1$n$ and an output terminal. The switches SW11 to SW1$n$ are turned on in response to first temperature compensation data to select a first reference voltage Vcr. The level of the first reference voltage Vcr is selected depending on which switch is turned on. Accordingly, the first temperature compensation data is used to change the first reference voltage Vcr depending on the temperature of the display panel 100.

The second reference voltage source includes a row of resistors R21 to R2$n$ for dividing an input voltage Vin, and a plurality of switches SW21 to SW2$n$.

The row of resistors R21 to R2$n$ divide the input voltage Vin and output a plurality of voltages with different voltage levels. The switches SW21 to SW2$n$ are connected in parallel between the row of resistors R11 to R1$n$ and an output terminal. The switches SW21 to SW2$n$ are turned on in response to third temperature compensation data to select a second reference voltage Vm. The level of the second reference voltage Vm is selected depending on which switch is turned on. Accordingly, the third temperature compensation data is used to change the second reference voltage Vm depending on the temperature of the display panel 100.

From the above description, those skilled in the art to which the present invention pertains will appreciate that various changes and modifications are possible without departing from the technical spirit of the present invention. Accordingly, the technical scope of this invention is not limited to what is described above, but rather defined by the appended claims.

The invention claimed is:

1. A touch sensing system comprising:
a charge distributor connected to a touch sensor, the charge distributor coupled to a first reference voltage;
a pre-amplifier comprising a first input terminal coupled to an output terminal of the charge distributor and a second input terminal coupled to a second reference voltage, the pre-amplifier configured to generate an analog voltage output based on a first voltage at the first input terminal and the second reference voltage;
an analog-to-digital converter configured to convert the analog voltage output received from the pre-amplifier to digital data; and
a temperature compensating device that receives temperature data indicating temperature of a display panel from a temperature sensor, the temperature compensating device varying one or more of the first reference voltage coupled to the charge distributor, the second reference voltage coupled to the pre-amplifier, and a capacitance of the charge distributor, in response to the temperature data by turning on or off at least two switches associated with the first reference voltage, the capacitance or the second reference voltage according to the temperature data.

2. The touch sensing system of claim 1, wherein the temperature compensating device comprises:
a look-up table that outputs temperature compensation data based on the temperature data from the temperature sensor; and
a temperature compensator that varies either the first reference voltage or the second reference voltage by turning on or off the at least two switches based on the temperature compensation data.

3. The touch sensing system of claim 2, wherein the temperature compensation data comprises first temperature compensation data used to select the first reference voltage depending on the temperature of the display panel, second temperature compensation data used to select the capacitance of the charge distributor depending on the temperature of the display panel, and third temperature compensation data used to select the second reference voltage depending on the temperature of the display panel.

4. The touch sensing system of claim 3, wherein the temperature compensator comprises:
a first reference voltage source that supplies the first reference voltage based on the first temperature compensation data; and
a second reference voltage source that supplies the second reference voltage based on the third temperature compensation data.

5. The touch sensing system of claim 4, wherein the charge distributor comprises a plurality of capacitors and a plurality of first switches of the at least two switches, the plurality of first switches connected between the output terminal of the charge distributor and the first reference voltage source,
wherein the first switches selectively couple capacitors between the first input terminal and the first reference voltage source, in response to the second temperature compensation data.

6. The touch sensing system of claim 5, wherein the first reference voltage source comprises a first row of resistors for dividing an input voltage, and a plurality of second switches of the at least two switches between a source of the input voltage and the charge distributor,
wherein the second reference voltage source comprises a second row of resistors for dividing the input voltage and a plurality of third switches between the source of the input voltage and the second input terminal of the pre-amplifier, and wherein the second switches are selectively turned on or off to control a level of the first reference voltage in response to the first temperature compensation data, and the third switches are selectively turned on or off to control a level of the second reference voltage in response to the third temperature compensation data.

7. The touch sensing system of claim 6, wherein the touch panel comprises a mutual capacitance type touch sensor or a self-capacitance type capacitance.

8. The touch sensing system of claim 1, wherein the first input terminal of the pre-amplifier is an inverting input terminal and the second input terminal of the pre-amplifier is a non-inverting input terminal.

9. A touch sensor driver circuit for a touch sensitive display device, comprising:
 a charge distributor connected to a touch panel to receive charge from at least one electrode of the touch panel, the charge distributor coupled to a first reference voltage;
 a pre-amplifier comprising a first input terminal coupled to an output terminal of the charge distributor and a second input terminal coupled to a second reference voltage, the pre-amplifier configured to generate an analog voltage output based on a first voltage at the first input terminal and the second reference voltage;
 an analog-to-digital converter configured to convert the analog voltage output received from the pre-amplifier to digital data; and
 a temperature compensating device that receives temperature data indicating temperature of a display panel from a temperature sensor, the temperature compensating device varying one or more of the first reference voltage coupled to the charge distributor, the second reference voltage coupled to the pre-amplifier, and a capacitance of the charge distributor, in response to the temperature data by turning on or off at least two switches associated with the first reference voltage, the capacitance or the second reference voltage according to the temperature data.

10. The touch sensor driver circuit of claim 9, wherein the temperature compensating device comprises:
 a look-up table that outputs temperature compensation data based on the temperature data from the temperature sensor; and
 a temperature compensator that varies either the first reference voltage or the second reference voltage based on the temperature compensation data.

11. The touch sensor driver circuit of claim 9, wherein the temperature compensation data comprises first temperature compensation data used to select the first reference voltage depending on the temperature of the display panel, second temperature compensation data used to select the capacitance of the charge distributor depending on the temperature of the display panel, and third temperature compensation data used to select the second reference voltage depending on the temperature of the display panel.

12. The touch sensor driver circuit of claim 11, wherein the temperature compensator comprises:
 a first reference voltage source that supplies the first reference voltage based on the first temperature compensation data; and
 a second reference voltage source that supplies the second reference voltage based on the third temperature compensation data.

13. The touch sensor driver circuit of claim 12, wherein the charge distributor comprises a plurality of capacitors and a plurality of first switches of the at least two switches, the plurality of first switches connected between the output terminal of the charge distributor and the first reference voltage source,
 wherein the first switches selectively couple capacitors between the first input terminal and the first reference voltage source, in response to the second temperature compensation data, to select capacitance of the charge distributor.

14. The touch sensor driver circuit of claim 13, wherein the first reference voltage source comprises a first row of resistors for dividing an input voltage, and a plurality of second switches of the at least two switches between a source of input voltage and the charge distributor,
 wherein the second reference voltage source comprises a second row of resistors for dividing the input voltage and a plurality of third switches between the source of input voltage and the second input terminal of the pre-amplifier, and
 wherein the second switches are selectively turned on or off to control a level of the first reference voltage in response to the first temperature compensation data, and the third switches are selectively turned on or off to control a level of the second reference voltage in response to the third temperature compensation data.

15. The touch sensor driver circuit of claim 14, wherein the touch panel comprises a mutual capacitance type touch sensor or a self-capacitance type touch sensor.

16. The touch sensor driver circuit of claim 9, wherein the first input terminal of the pre-amplifier is an inverting input terminal and the second input terminal of the pre-amplifier is a non-inverting input terminal.

\* \* \* \* \*